(12) United States Patent
Liu et al.

(10) Patent No.: US 10,319,966 B2
(45) Date of Patent: Jun. 11, 2019

(54) POWER BATTERY DEVICE

(71) Applicant: BYD COMPANY LIMITED, Shenzhen (CN)

(72) Inventors: Xing Liu, Shenzhen (CN); Hongjun Wang, Shenzhen (CN); Chao Zhang, Shenzhen (CN); Fangfang Bu, Shenzhen (CN); Liqiang Chen, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 253 days.

(21) Appl. No.: 15/122,621

(22) PCT Filed: Apr. 29, 2015

(86) PCT No.: PCT/CN2015/077847
§ 371 (c)(1),
(2) Date: Aug. 30, 2016

(87) PCT Pub. No.: WO2015/165407
PCT Pub. Date: Nov. 5, 2015

(65) Prior Publication Data
US 2017/0069886 A1 Mar. 9, 2017

(30) Foreign Application Priority Data
Apr. 30, 2014 (CN) .................... 2014 2 0220053 U

(51) Int. Cl.
*H01M 2/10* (2006.01)
*B60K 1/04* (2019.01)
(52) U.S. Cl.
CPC ............. *H01M 2/1077* (2013.01); *B60K 1/04* (2013.01); *H01M 2220/20* (2013.01)

(58) Field of Classification Search
None
See application file for complete search history.

(56) References Cited

U.S. PATENT DOCUMENTS

| 5,639,571 A | 6/1997 | Waters et al. |
| 5,736,272 A | 4/1998 | Veenstra et al. |

(Continued)

FOREIGN PATENT DOCUMENTS

| CN | 1592976 A | 3/2005 |
| CN | 201708212 U | 1/2011 |

(Continued)

OTHER PUBLICATIONS

The World Intellectual Property Organization (WIPO) International Search Report for PCT/CN2015/077847 dated Jul. 17, 2015 pp. 1-3.

*Primary Examiner* — Carmen V Lyles-Irving
(74) *Attorney, Agent, or Firm* — Anova Law Group, PLLC

(57) ABSTRACT

A power battery device includes: a battery tray having a positioning member provided on the upper surface thereof; and a plurality of battery modules disposed on the battery tray and arranged in at least two layers in an up-down direction, each battery module comprising: a housing having a first positioning portion disposed on the upper surface of the housing and a second positioning portion disposed on the lower surface of the housing; a battery disposed within the housing, the first positioning portion of the housing in a lower layer is matched with the second positioning portion of the housing in an upper layer, and the battery modules in the lowermost layer of the battery modules are positioned by the positioning member.

10 Claims, 4 Drawing Sheets

(56) References Cited

U.S. PATENT DOCUMENTS

| | | |
|---|---|---|
| 5,981,101 A | 11/1999 | Stone |
| 6,451,475 B1 | 9/2002 | Sherwood |
| 2010/0025137 A1 | 2/2010 | Mughal |
| 2011/0117401 A1* | 5/2011 | Lee .................... H01M 2/0245 429/82 |
| 2011/0117419 A1 | 5/2011 | Lee et al. |
| 2013/0177793 A1 | 7/2013 | Seki |

FOREIGN PATENT DOCUMENTS

| | | |
|---|---|---|
| CN | 102088104 A | 6/2011 |
| CN | 102893426 A | 1/2013 |
| CN | 202797124 U | 3/2013 |
| CN | 203134883 U | 8/2013 |
| CN | 203871400 U | 10/2014 |
| EP | 2325923 A1 | 5/2011 |
| GB | 2446229 A | 8/2008 |
| JP | H10125292 A | 5/1998 |
| JP | 2005129267 A | 5/2005 |
| JP | 4734826 B2 | 7/2011 |
| KR | 101227654 B1 | 1/2013 |

\* cited by examiner

POWER BATTERY DEVICE

CROSS-REFERENCE TO RELATED APPLICATION

This application is a national phase entry under 35 U.S.C. § 371 of International Application No. PCT/CN2015/077847, filed on Apr. 29, 2015, which claims priority to and benefits of Chinese Patent Application Serial No. 201420220053.X, filed with the State Intellectual Performance Office of P. R. China on Apr. 30, 2014, the entire contents of all of which are incorporated herein by reference.

FIELD

Embodiments of the present disclosure relates to the field of battery, more particularly to a power battery device.

BACKGROUND

The statements in this section merely provide background information related to the present disclosure and may not constitute prior art.

Commonly, the arrangement of the power battery has a close relationship with the utilization of space, and the current power battery has the disadvantages of unreasonable layout, resulting in low utilization of space.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present disclosure seek to solve at least one of the problems existing in the prior art to at least some extent.

Embodiments of a broad aspect of the present disclosure provide a power battery device. The power battery device according to embodiments of the present disclosure may include a battery tray having a positioning member provided on the upper surface thereof; and a plurality of battery modules disposed on the battery tray and arranged in at least two layers in an up-down direction, each battery module includes: a housing having a first positioning portion disposed on the upper surface of the housing and a second positioning portion disposed on the lower surface of the housing; a battery disposed within the housing, wherein in two adjacent layers of the battery modules, the first positioning portion on the upper surface of the housing in a lower layer the battery modules is matched with the second positioning portion on the lower surface of the housing of a upper layer of the battery modules, and the battery modules in the lowermost layer of the battery modules are positioned by the positioning member.

With the power battery device according to embodiments of the present disclosure, by providing the first positioning portion on the upper surface of the housing and the second positioning portion on the lower surface of the housing, a multi-layer structure of the battery module can be achieved, which may greatly reduce the occupied space of the power battery device, and greatly improve the utilization of space of the power battery device, and the battery module can have a reasonable arrangement, thus effectively solved the layout problem of the power battery.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings, in which.

DETAILED DESCRIPTION

Figure 1:
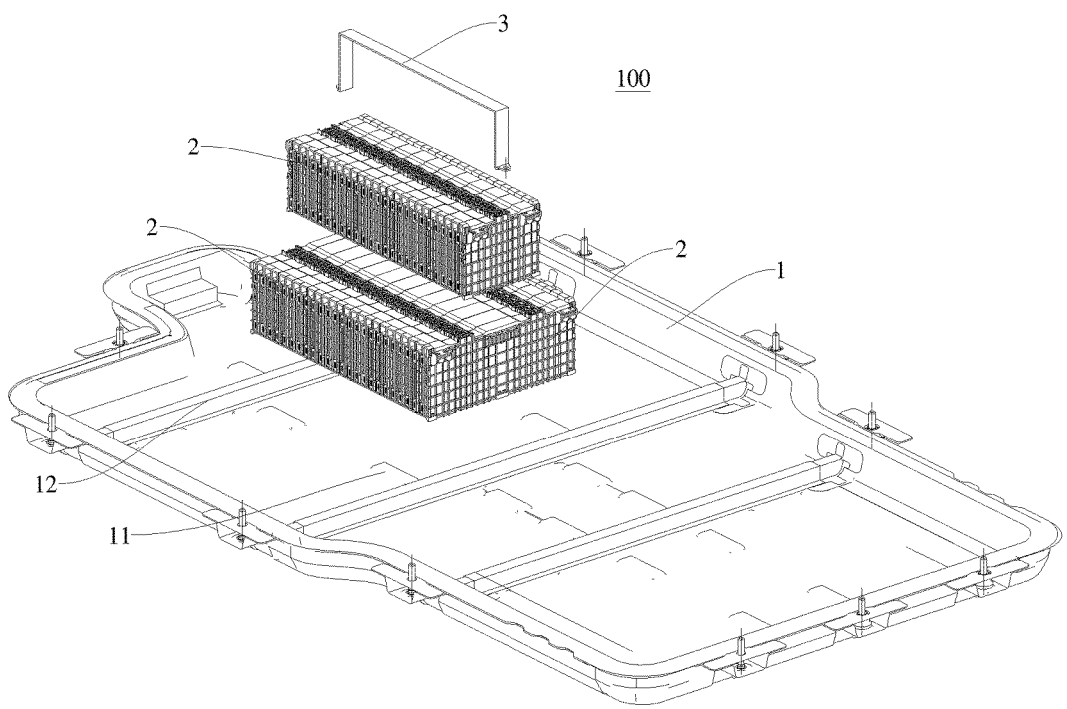
FIG. 1 is an exploded view of a power battery device according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, it should be understood that, the terms such as "central", "longitudinal", "lateral", "width", "thickness", "above", "below", "front", "rear", "right", "left", "vertical", "horizontal", "top", "bottom", "inner", "outer", "clockwise", "counter-clockwise" should be construed to refer to the orientation as then described or as shown in the drawings. These terms are merely for convenience and concision of description and do not alone indicate or imply that the device or element referred to must have a particular orientation. Thus, it cannot be understood to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more this feature. In the description of the present disclosure, "a plurality of" means two or more than two this features, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

As shown in FIGS. 1-6, in one embodiment, a power battery device 100 is provided. The power battery device 100 is disposed in an electric vehicle and adapted to be a power source.

Figure 2:
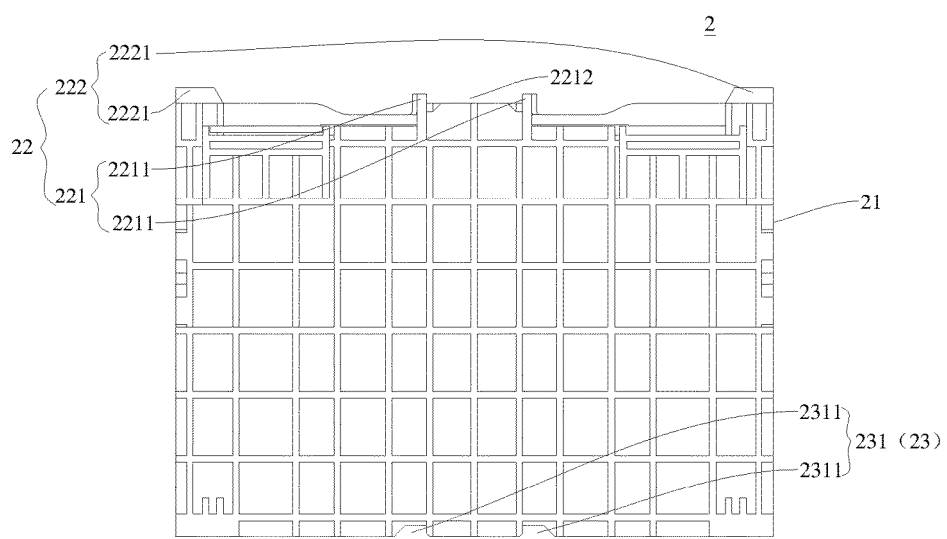
FIG. 2 is a side view of one battery module of the power battery device according to an embodiment of the present disclosure.

In some embodiments, as shown in FIG. 1 and FIG. 2, the power battery device 100 may include: a battery tray 1 and a plurality of battery modules 2. In some embodiments, each battery module 2 may include a housing 21 for accommodating a single battery. A first positioning portion is disposed on an upper surface of the housing 21 and a second positioning portion is disposed on a lower surface of the housing 21. A positioning member 11 is provided on an upper surface of the battery tray 1. The battery tray 1 is configured to mount the battery modules 2, and a plurality of the battery modules 2 are provided on the battery tray 1 and arranged in at least two layers in an up-down direction. In adjacent two layers of the battery modules 2, the first positioning portion on the upper surface of the housing 21 in the lower layer is matched with the second positioning portion on the lower surface of the housing 21 in the upper layer, and the battery module 2 disposed in the lowermost layer of the battery modules 2 are positioned by the positioning member 11.

In the prior art, due to structural limit of the battery module, battery modules are able to be arranged in only one layer, which may increase the occupied space of the battery modules and greatly reduce the space utilization, especially in the up-down direction, and result in the difficult arrangement of the battery modules for the space limit.

With the power battery device 100 according to embodiments of the present disclosure, by providing the first positioning portion on the upper surface of the housing 21 and the second positioning portion on the lower surface of the housing 21, a multi-layer structure of the battery module 2 can be achieved, which may greatly reduce the occupied space of the power battery device 100, and greatly improve the utilization of space of the power battery device 100, and the battery module can have a reasonable arrangement, thus effectively solved the layout problem of the power battery.

In some embodiments, the structure of the battery modules 2 of the power battery device 100 may be identical with one another, thereby facilitating the standardized production of the battery module 2. In some embodiments, the structure of the battery modules 2 may be not exactly the same, for example, when the battery modules 2 are assembled in mufti-layers in the up-down direction, the second positioning portion may be not provided on the housing 21 of the battery modules 2 disposed on the lowermost layer, or the first positioning portion may be not provided on the housing 21 of the battery modules 2 disposed on the uppermost layer, thereby meet the needs of the actual situation.

Figure 3:
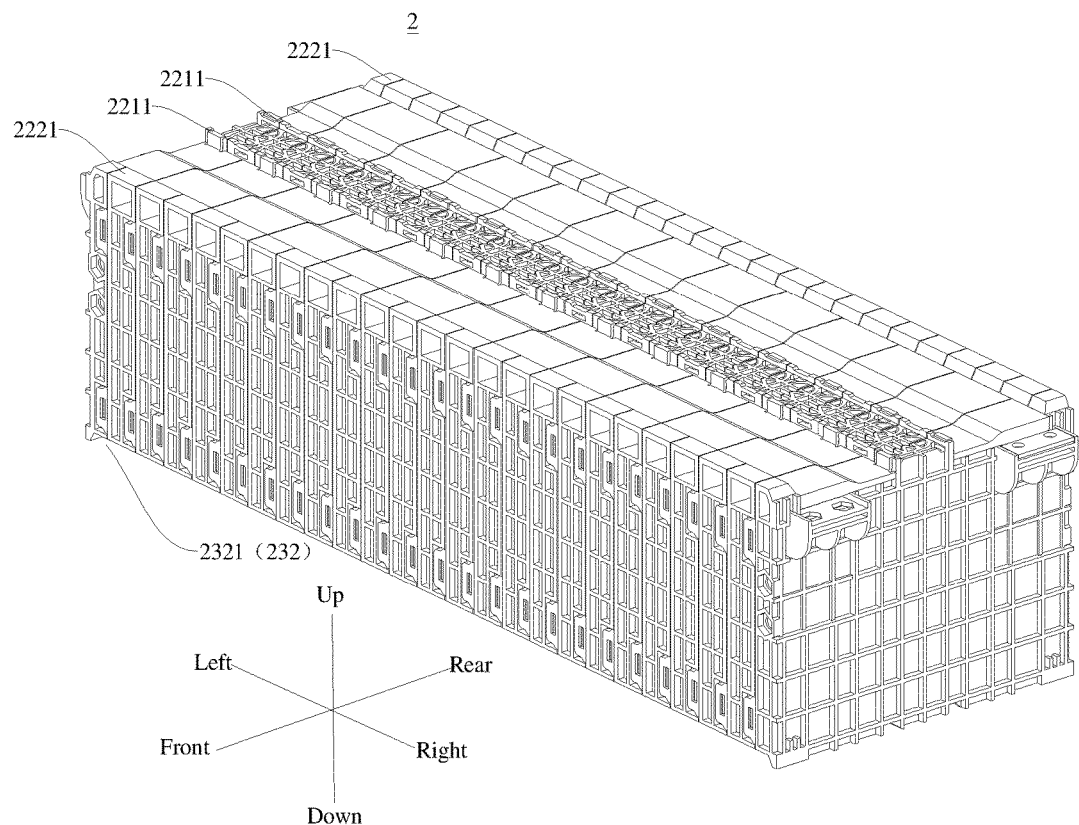
FIG. 3 is a perspective view of a battery module of the power battery device in FIG. 1.
Figure 4:
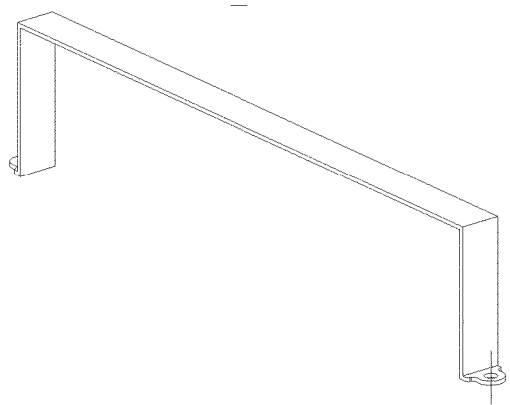
FIG. 4 is a perspective view of a fixed frame according to an embodiment of the present disclosure.

In some embodiments, as shown in FIG. 2 and FIG. 3, the first positioning portion is configured as a positioning projection 22, and the second positioning portion is configured as a positioning groove 23. The positioning projection 22 is adapted for matching with the positioning groove 23. The positioning projection 22 is configured as the structure protruding upwardly from the upper surface of the housing 21. The positioning groove 23 is configured as the structure concaving upward from the lower surface of the housing 21. When assembling the battery modules 2, the positioning projection 22 of the battery module 2 disposed on the lower layer is matched with the positioning groove 23 of the battery module 2 disposed on the upper layer, which may ensure the stability of the two adjacent layers of the battery module 2, and prevent relative movement between the two adjacent layers of the battery module 2. The positioning projection 22 and the positioning groove 23 also have advantages of simple structure, easy to implement, and low manufacturing cost.

Furthermore, by providing the positioning groove 23 on the lower surface of the housing 21 of the battery modules 2 as a positioning portion, when the battery module 2 is mounted to the battery tray 1, the battery module 2 disposed on the lowermost layer is more stable with the battery tray 1, and not easy to be shaken. In some embodiments, as shown in FIG. 1, the positioning member 11 of the battery tray 1 may be configured as a projection, and there may be a plurality of projections. The battery module 2 disposed on the lowermost layer may be positioned between two adjacent projections, to further ensure the stability of the position of the battery modules 2.

In some embodiments, as shown in FIG. 2 and FIG. 3, on the housing 21, the positioning projection 22 includes a first positioning projection 221 disposed in the middle of the upper surface of the housing 21 in the front-rear direction. The positioning groove 23 includes a first positioning groove 231 disposed in the middle of the lower surface of the housing 21 in the front-rear direction. When the battery modules 2 are assembled together, the first positioning projection 221 is matched with the first positioning groove 231 to assemble two adjacent layers of the battery modules, so that to ensure the connection between the two adjacent layers of the battery modules more stable.

In some embodiments, as shown in FIG. 2 and FIG. 3, the first positioning projection 221 is extended in a left-right of the housing 21. The first positioning groove 231 is extended in the left-right of the housing 21. That is, the first positioning projection 221 and the first positioning groove 231 are extended along a length direction of the housing 21 respectively. In some embodiments, the first positioning projection 221 and the first positioning groove 231 may be extended along the entire length direction of the housing 21, so that when the battery modules 2 are assembled, the matching of the adjacent layers of the battery module may be more stable.

In some embodiments, as shown in FIG. 2 and FIG. 3, the first positioning projection 221 may include two first sub-protrusions 2211 extended in the left-right direction. The two first sub-protrusions 2211 are disposed symmetrically with respect to a centerline of the housing 21 along the left-right direction. The first positioning groove 231 may include two first sub-grooves 2311 extended in the left-right direction, and the two first sub-grooves 2311 are disposed symmetrically with respect to the centerline of the housing 21 along the left-right direction. The first sub-protrusions 2211 and the first sub-grooves 2311 are one-to-one correspondence with each other in the up-down direction. That is, the first sub-grooves 2311 disposed on a first side of the centerline of the housing 21 is corresponding to the first sub-protrusion 2211 disposed on the first side; the first sub-grooves 2311 disposed on a second side of the centerline of the housing 21 is corresponding to the first sub-protrusion 2211 disposed on the second side. It may improve the matching stability between the first protrusion 221 and the first positioning groove 231.

It should be noted that, in the description according to embodiments of the present disclosure, the term "front-rear direction" refers to the width direction of the housing 21, and the term "left-right direction" refers to the length direction of the housing 21. Further, the term "centerline of the housing 21 along the left-right direction" means a line passes through the middle point in the width of the housing 21 and extends along the left-right direction of the housing 21.

In some embodiments, a recess 2212 with a predetermined width is formed between the two first sub-protrusions 2211. In some embodiments, the power battery device further includes a fixed frame 3 fixing the at least two layers of the battery modules in the up-down direction within the fixed frame and connected with the battery tray 1, i.e. the fixed frame is pressed on the upper surface of the housing disposed in the uppermost layers, so that the multi-layers of the battery modules can be fixed in the up-down direction and configured to fix on the battery tray as an integrated unit. In some embodiments, a width of the fixed frame 3 is matched with the width of the recess 2212 of the housing in the uppermost layer of the battery module 2, such that the fixed frame 3 can be positioned within the recess 2212.

The fixed frame 3 may fix the battery modules to the battery tray 1, and guarantee the mounting of the battery module more stable. In some embodiments, a plurality of separators 12 are disposed on the battery tray 1 and spaced from one another in the left-right direction. A space for mounting the battery module 2 is formed between two adjacent separators 12. Both ends of the fixed frame 3 may be connected with the separator 12 of the battery tray 1.

In some embodiments, as shown in FIG. 2 and FIG. 3, on the housing 21, the positioning projection 22 may include a second positioning projection 222. The second positioning projection 222 is disposed on two edges of the upper surface of the housing 21 in the left-right direction. The positioning groove 23 may include a second positioning groove 232. The second positioning groove 232 is disposed on two edges of the lower surface of the housing 21 in the front-rear direction.

By providing the positioning projection 22 and the positioning recesses 23, when assembling the battery modules 2, the second positioning projection 222 of the battery module 2 disposed on the lower layer may match with the second positioning groove 232 of the battery module 2 disposed on the adjacent upper layer to ensure the stable connection between the battery modules 2 of adjacent layers.

It should be noted that, both of the first positioning projection 221 and second positioning projection 222 may be disposed on the housing 21, or only first positioning projection 221 or second positioning projection 222 is disposed on the housing 21.

In some embodiments, the second positioning projection 222 is extended in the left-right of the housing 21. In some embodiments, the second positioning groove 232 is extended in the left-right of the housing 21. In some embodiments, the second positioning projection 222 and the second positioning groove 232 may be extend along the entire length direction of the housing 21.

In some embodiments, the second positioning projection 222 may include two second sub-protrusions 2221, and the two second sub-protrusions 2221 are disposed symmetrically with respect to the centerline of the housing 21 along the left-right direction. In some embodiments, the second positioning groove 232 may include two second sub-grooves 2321, and the two second sub-grooves 2321 are disposed symmetrically with respect to the centerline of the housing 21 along the left-right direction. The second sub-protrusions 2221 and the second sub-grooves 2321 are disposed correspondingly with each other in the up-down direction, so when assembling the battery modules 2, the sub-protrusions 2221 is matched with the sub-grooves 2321 to ensure the connection stability of the battery modules 2 of adjacent layers.

Figure 5:
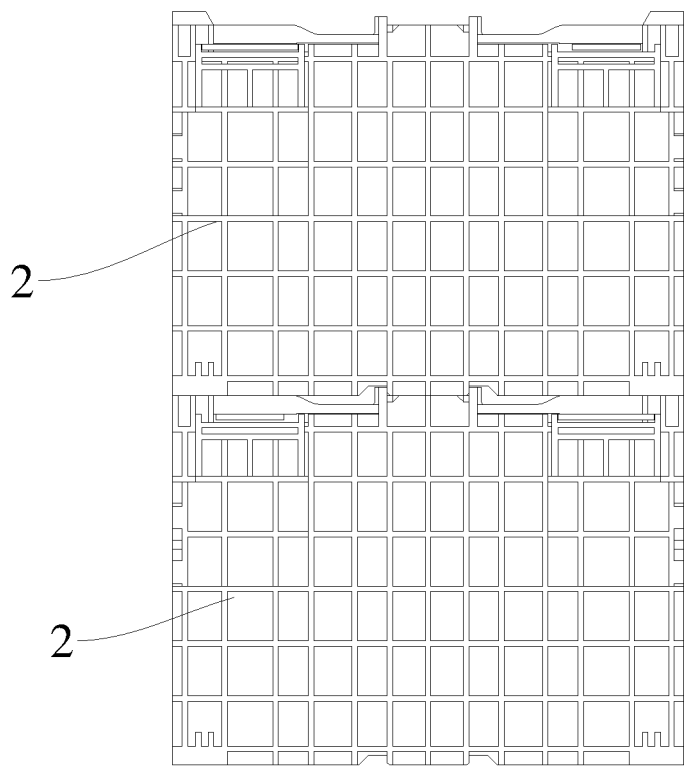
FIG. 5 is a schematic view of a layout of a battery module unit according to an embodiment of the present disclosure.

In some embodiments, as shown in FIG. 5, the power battery device 100 may include at least one battery module unit 4. In some embodiments, each battery module unit 4 may include two battery modules 2 arranged in the up-down direction, and the centerline of the two battery modules 2 in the front-rear direction coincide in the upper-down direction. In some embodiments, the battery module unit 4 may include a plurality of battery module units 4.

Figure 6:
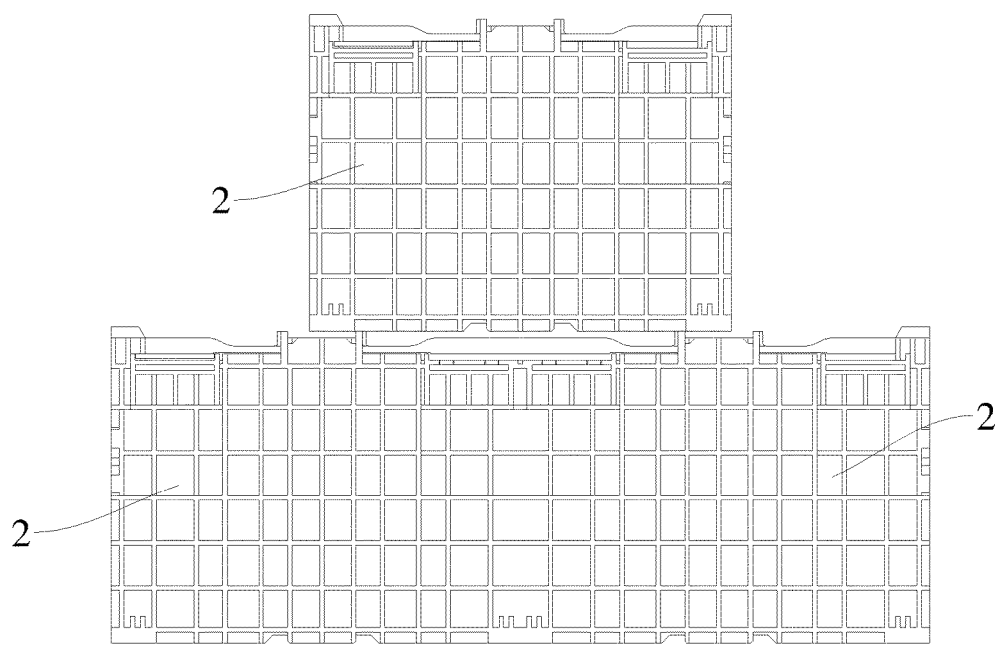
FIG. 6 is a schematic view of layout of a battery module unit according to another embodiment of the present disclosure.

In some embodiments, as shown in FIG. 6, each battery module unit 4 may include three battery modules 2, and two of the three battery modules 2 are arranged in the lower layer and one of the three battery module 2 is arranged on both of the two battery modules and disposed in the adjacent upper layer. That is, the two battery modules 2 of the battery module unit 4 are arranged in the lower layer and disposed shoulder-by-shoulder along the front-rear direction of the housing 21, and the one battery module 2 of the battery module unit 4 is disposed in the upper layer and arranged above the two battery modules 2. Preferably, the one battery module 2 may be located on the center of the two battery modules 2. In some embodiments, the two second sub-grooves 2321 disposed on the housing of the battery module 2 arranged in the lower layer may be respectively matched with the two first sub-protrusions 2211 disposed on the two battery modules 2 arranged in the adjacent upper layer, to ensure the mounting stability of the battery module 2 arranged on the upper layer.

In some embodiments, the battery module unit 4 may include a plurality of battery module units 4.

It should be noted that, according to embodiments of the present disclosure, other structures of the power battery device 100, for example, the matching structure between the housing 21 and the bracket of the single battery is well known to those of ordinary skill of ordinary skill in the art, so it is not described in detail here.

With the power battery device according to embodiments of the present disclosure, by providing the first positioning portion on the upper surface of the housing and the second positioning portion on the lower surface of the housing, a multi-layers structure of the battery module can be realized, which may greatly reduce the occupied space of the power battery device, and greatly improve the utilization of space of the power battery device, and the battery module is reasonably arranged, thus effectively solving the layout problem of the power battery.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A power battery device, comprising:
   a battery tray having a positioning member provided on the upper surface thereof; and
   a plurality of battery modules disposed on the battery tray and arranged in at least two layers in an up-down direction, each battery module comprising:
     a housing having a first positioning portion disposed on the upper surface of the housing and a second positioning portion disposed on the lower surface of the housing;
     a battery disposed within the housing,
   wherein in two adjacent layers of the battery modules, the first positioning portion on the upper surface of the housing in a lower layer the battery modules is matched with the second positioning portion on the lower surface of the housing in an upper layer of the battery modules, and the battery modules in the lowermost layer of the battery modules are positioned by the positioning member;
   the first positioning portion is configured as a positioning projection, and the second positioning portion is configured as a positioning groove adapted for matching with the positioning projection;
   the positioning projection comprises: a first positioning projection disposed in the middle of the upper surface of the housing in the front-rear direction; and the positioning groove comprises: a first positioning groove disposed in the middle of the lower surface of the housing in the front-rear direction;
   the first positioning projection is extended in a left-right of the housing; and the first positioning groove is extended in the left-right of the housing;
   the first positioning projection comprises two first sub-protrusions, and the two first sub-protrusions are disposed symmetrically with respect to a centerline of the housing along the left-right direction; and
   the first positioning groove comprises two first sub-grooves, and the two first sub-grooves are disposed symmetrically with respect to the centerline of the housing along the left-right direction and one-to-one correspondence with corresponding first sub-protrusions in the up-down direction.

2. The power battery device of claim 1, wherein a recess with a predetermined width is formed between the two first sub-protrusions.

3. The power battery device of claim 1, wherein the positioning projection comprises: a second positioning projection disposed on an edge of the upper surface of the housing in a left-right direction; and wherein the positioning groove comprises: a second positioning groove disposed on an edge of the lower surface of the housing in the left-right direction.

4. The power battery device of claim 3, wherein the second positioning projection is extended in the left-right direction of the housing; and
   wherein the second positioning groove is extended in the left-right direction of the housing.

5. The power battery device of claim 4, wherein the second positioning projection comprises two second sub-protrusions, and the two second sub-protrusions are disposed symmetrically with respect to a centerline of the housing along the left-right direction;
   wherein the second positioning groove comprises two second sub-grooves, and the two second sub-grooves are disposed symmetrically with respect to the centerline of the housing along the left-right direction and one-to-one correspondence with corresponding second sub-protrusions in the up-down direction.

6. The power battery device of claim 1, further comprising a fixed frame fixing the at least two layers of the battery modules in the up-down direction within the fixed frame and connected with the battery tray.

7. The power battery device of claim 1, wherein the power battery device comprises at least one battery module unit, and each of the battery module unit comprises two battery modules arranged in the up-down direction, and centerlines of the two battery modules in the front-rear direction coincide in the upper-down direction.

8. The power battery device of claim 1, wherein the power battery device comprises at least one battery module unit, and each of the battery module unit comprises a first battery module, a second battery module and a third battery module, the first battery module and the second battery module are arranged in the lower layer and the third battery module is disposed on the upper layer.

9. The power battery device of claim 1, further comprising a fixed frame fixing the plurality of battery modules to the battery tray, wherein the fixed frame is pressed on an upper surface of the housing of an uppermost battery module of the plurality of battery modules and are connected with the battery tray.

10. The power battery device of claim 9, wherein a width of the fixed frame is matched with the width of the recess of the housing of the uppermost battery module.

* * * * *